United States Patent [19]
Slosiarek

[11] 4,174,117
[45] Nov. 13, 1979

[54] ISOLATED STEP SUPPORT

[75] Inventor: Michael L. Slosiarek, Greenfield, Wis.

[73] Assignee: Allis-Chalmers Corporation, Milwaukee, Wis.

[21] Appl. No.: 863,337

[22] Filed: Dec. 22, 1977

[51] Int. Cl.² .............................................. B60R 3/00
[52] U.S. Cl. ................................................. 280/163
[58] Field of Search ...................... 280/163, 166, 164

[56] References Cited

U.S. PATENT DOCUMENTS

| | | | |
|---|---|---|---|
| 2,545,139 | 3/1951 | Elfes | 280/163 |
| 3,244,433 | 4/1966 | Grigsby | 280/163 |
| 3,378,278 | 4/1968 | Fraitzheim | 280/163 |
| 4,053,172 | 10/1977 | McClure | 280/163 |

Primary Examiner—Robert R. Song
Attorney, Agent, or Firm—Arthur L. Nelson

[57] ABSTRACT

An isolated step on a tractor with means isolating the step from the vehicle chassis and for dampening vibrations of the step which is mounted on an isolated cab of the tractor.

10 Claims, 5 Drawing Figures

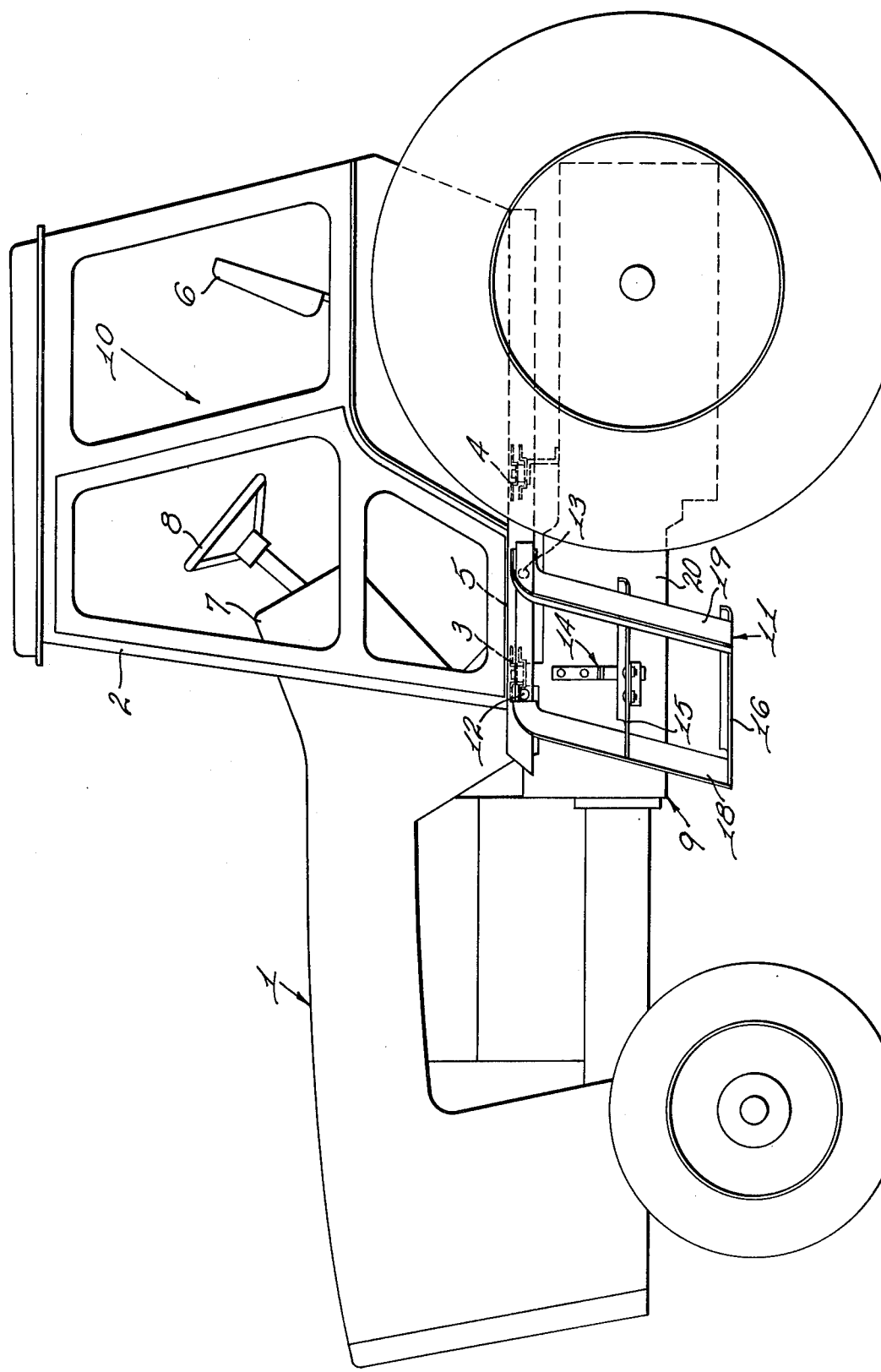

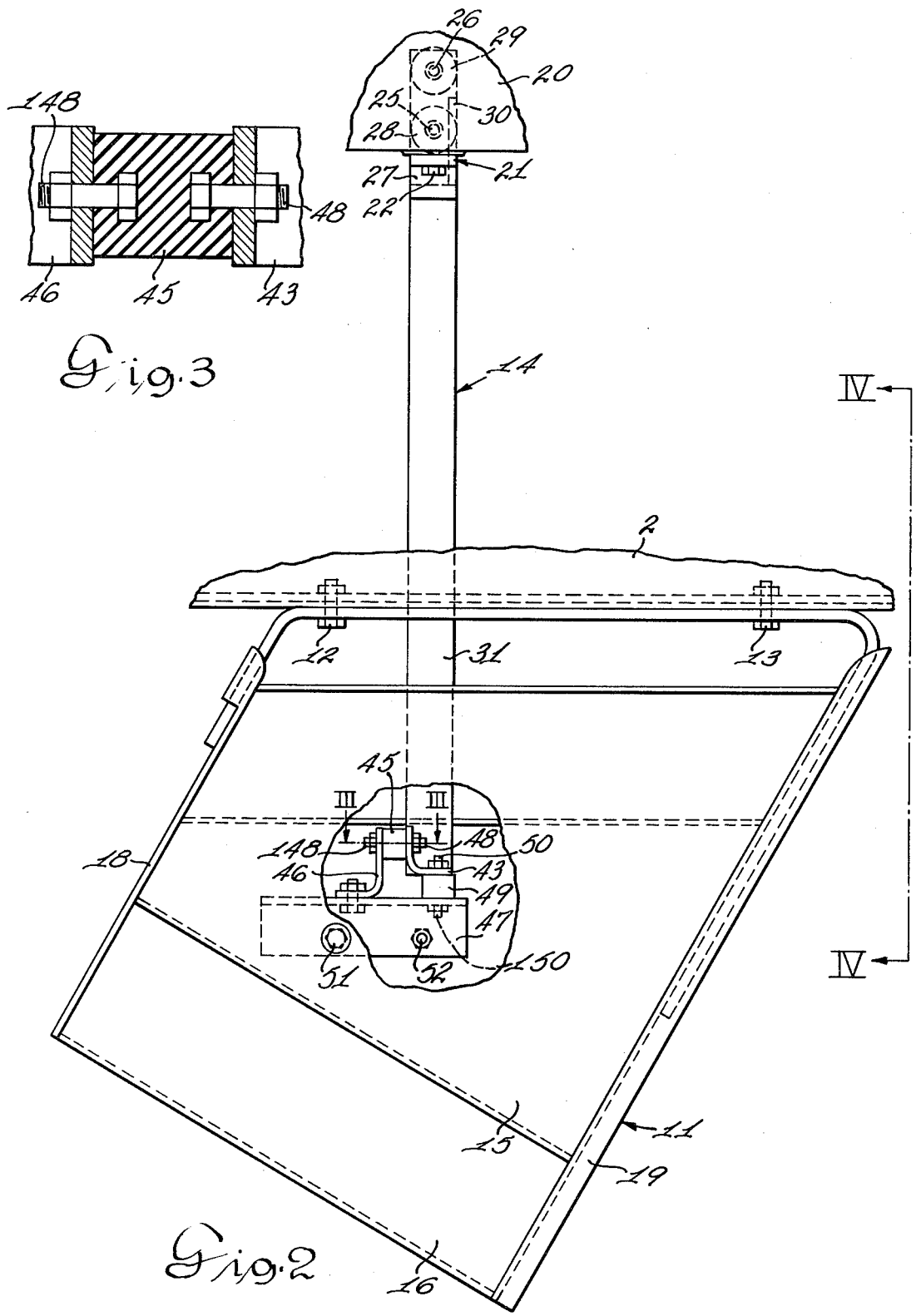

ISOLATED STEP SUPPORT

This invention relates to a step for a tractor and more particularly to an isolated support for a step mounted on an isolated cab to reduce sound transmission from the tractor chassis to the cab and reduce the sound level in the cab.

The larger tractors as presently used are so large that it is difficult to gain access to the cab without the use of steps. Steps are conventionally mounted on the tractor chassis and may tend to increase vibrations and the noise levels in the cab. Accordingly, with the cab resiliently mounted on the tractor chassis, a dampening effect is provided through the resilient mounting of the step of the chassis. Mounting of the step on the cab itself even though the cab is isolated from the vehicle chassis may also increase vibrations of the steps and the noise level in the cab. To insulate the support for the step mounted on the vehicle cab will reduce vibrations of the step. Accordingly, an isolated step support is provided to reduce vibrations of the step and also decrease the sound level in the cab. This is accomplished through mounting a step support on the vehicle chassis and resiliently supporting the step on the step support.

Accordingly, it is an object of this invention to provide an isolated step on a tractor isolated from the vehicle chassis.

It is another object of this invention to provide a step mounted on an isolated cab and supporting the step through an isolated step support mounted on the vehicle chassis to isolate the cab and step to reduce vibrations of the cab and the step.

It is a further object of this invention to provide a step mounted integral with the vehicle cab isolated from the vehicle chassis to reduce the sound level in the vehicle cab.

The objects of this invention are accomplished by mounting a step on a vehicle to gain access to the cab. Mounting the step on the cab which is isolated from the vehicle chassis provides an integral assembly between the cab and the step. The step is suspended from the cab and is also supported on a step support which is mounted through isolating means from the vehicle chassis. The step is supported through resilient means to dampen vibrations in at least two directions to reduce vibrations and reduce the sound level in the cab.

Referring to the drawings, the preferred embodiment of this invention is illustrated.

FIG. 1 illustrates a side elevation view of a tractor with a cab and the step;

FIG. 2 is a plan view partially sectioned to show the mounting of the step on the cab and tractor;

FIG. 3 is a section view taken on line III—III of FIG. 2;

Figure 4:
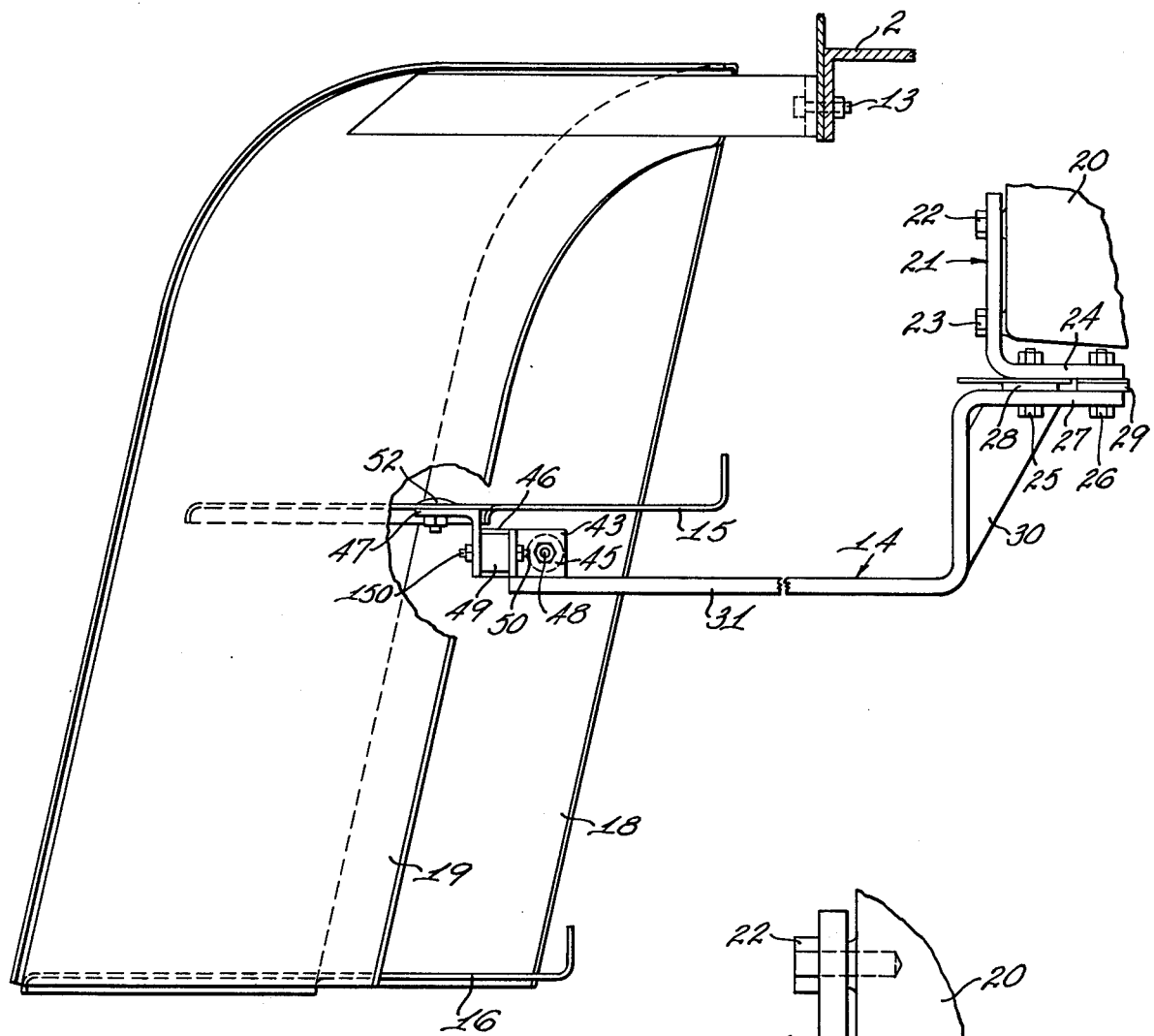
FIG. 4 is a view of the step mounted on the tractor taken on line IV—IV of FIG. 2.
Figure 5:
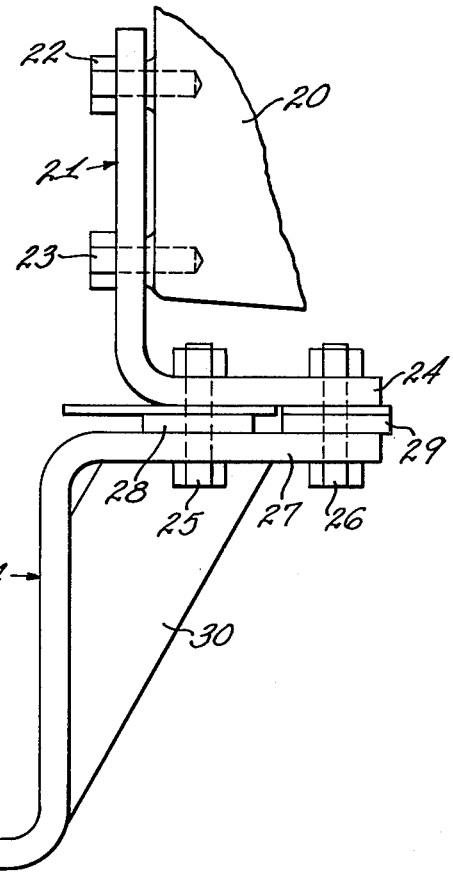
FIG. 5 is an enlarged view of the step support mounting.

Referring to FIG. 1, a tractor 1 is shown with a cab 2 mounted on resilient isolators of which 3 and 4 are shown. The platform 5 and cab 2 define the operator station together with the seat 6, control console 7, and steering wheel 8. The cab 2 and platform 5 are resiliently mounted on the vehicle chassis 9 to dampen vibrations and reduce the sound level at the operator station 10. The step 11 is fastened on the cab by the bolts 12 and 13 and supported by a step support 14. The step 11 includes the two steps 15 and 16 which are mounted between the side plates 18 and 19. The step 11 extends transversely and slightly forwardly of the vehicle cab for convenient access to the cab.

FIG. 2 shows the plan view of the step 11 and FIG. 3 shows a section taken on line III—III of FIG. 2. The transmission housing 20 of the vehicle chassis 9 provides a means for fastening the hanger bracket 21 by means of the screws 22 and 23. The hanger bracket has an L-shaped construction with a horizontal portion 24 carrying the screws 25 and 26 which in turn fasten the step support bracket 27. The screws 25 and 26 extend through the spacers 28 and 29 to provide support for the support bracket 27 on the underside of the horizontal portion 24 of the hanger bracket 21. The support bracket is formed with a gusset 30 to provide stiffness to the brace on the supported portion. A horizontal portion 31 extends beneath the upper step 15 and includes angle 43 fabricated to the supporting end of the step support 14. The angle 43 on the support bracket 31 carries the isolator 45 which is also fastened to the tab 46 of the step carrier 47. The bolts 48 and 148 extend from the rubber isolator to isolate the support bracket 31 from the step carrier bracket 47.

Similarly, the isolator 49 is positioned between the angle 43 of the support bracket 27 and the step carrier bracket 47 and fastened by the bolts 50 and 150. Accordingly, the isolators 45 and 49 isolate the support bracket from the carrier bracket 47. The carrier bracket 47 is fastened by the bolts 51 and 52 to the step 15 from the underside for supporting the step.

Accordingly, the cab 2 is resiliently mounted on the vehicle chassis 9. Sound transmission from the chassis through the rubber isolators 3 and 4 which support the platform 5 and the cab 2 is dampened. The step 11 is integral with the cab and is isolated with the cab from the vehicle chassis 9 by the rubber isolators through isolators 45 and 90.

The step support 14 is supported on the vehicle chassis. Accordingly, the hanger bracket 21 mounted on the transmission housing 20 of the vehicle chassis 9 provides the support for the step support bracket 31. Similarly, the step support bracket 31 extends beneath the upper step 15. The carrier bracket 47 is bolted to the upper step 15. The rubber isolators 45 and 49 mounted between the carrier bracket 47 and the step support 14 reduce sound transmission between the step support 49 and the carrier bracket 47. The rubber isolators 45 and 49 restrain movement in the fore and aft direction and the transverse direction between the step support bracket 27 and the step carrier bracket 47. Accordingly, the step and cab as an integral structure are isolated from the vehicle chassis and any tendency of the step to increase its amplitude of vibrations are dampened by the step support 14 which is resiliently supported on the vehicle chassis and resiliently connected to the step. Accordingly, the step support provides the dual function of supporting the step and also reducing vibrations of the step and the sound level in the cab over from the sound level if the step were not isolated or if the step were mounted on the vehicle cab without a isolated step support.

The embodiments of the invention in which an exclusive property or privilege is claimed are defined as follows:

1. An isolated step for a vehicle comprising, a vehicle chassis, a vehicle cab, isolators resiliently mounting said cab on said vehicle chassis, a step mounted on said vehicle cab, a step support mounted on said vehicle chassis, isolator means on said step support supporting said step and dampening vibrations of said step in at least two directions to thereby reduce vibrations of said step and cab.

2. An isolated step for a vehicle as set forth in claim 1 wherein said step support includes a brace for supporting said step, a bracket mounted on said step, said isolator means connected between said brace on said step support and said bracket on said step define horizontal isolators dampening movement of said step in a horizontal direction.

3. A isolated step for a vehicle as set forth in claim 1 wherein said step support includes a step support bracket, said isolator means positioned longitudinally and transversely between said step support bracket and said step dampening vibrations in the longitudinal and transverse direction of said vehicle chassis.

4. An isolated step support as set forth in claim 1 wherein said step defines a pendent structure fastened on the side of said cab, said step support defines a transverse structure restraining transverse movement of said step.

5. An isolated step for a vehicle as set forth in claim 1 wherein said step includes means diagonally supporting said step from said vehicle chassis, means positioning said isolator means in a transverse and longitudinal positions.

6. An isolated step for a vehicle as set forth in claim 1 wherein said step support defines a support extending transversely from said vehicle chassis to support said vehicle step, means connecting said step diagonally on said vehicle chassis.

7. An isolated step for a vehicle as set forth in claim 1 wherein said step support includes a hanger bracket mounted on said vehicle chassis, a support bracket connected intermediate said step and said hanger bracket, said isolator means including two rubber isolators connected between said step support and said step.

8. An isolated step support for a vehicle as set forth in claim 1 wherein said step support extends transversely from said vehicle chassis, means mounting said step in a diagonally forward direction on said chassis, said isolator means including a pair of longitudinal and transverse isolators mounted forwardly and outwardly on said step support and engaging said vehicle step to compressively load said isolators in the longitudinal and transverse direction of said vehicle chassis when weight is placed on said step.

9. An isolated step for a vehicle as set forth in claim 1 wherein said isolators define rubber isolators mounted under said cab, said isolator means supporting said step define rubber isolators for supporting said step.

10. An isolated step for a vehicle as set forth in claim 1 including means fastening said step on the side of said cab, said step support defining a relatively rigid transverse structure for bracing said step.

* * * * *